United States Patent Office 3,179,994
Patented Apr. 27, 1965

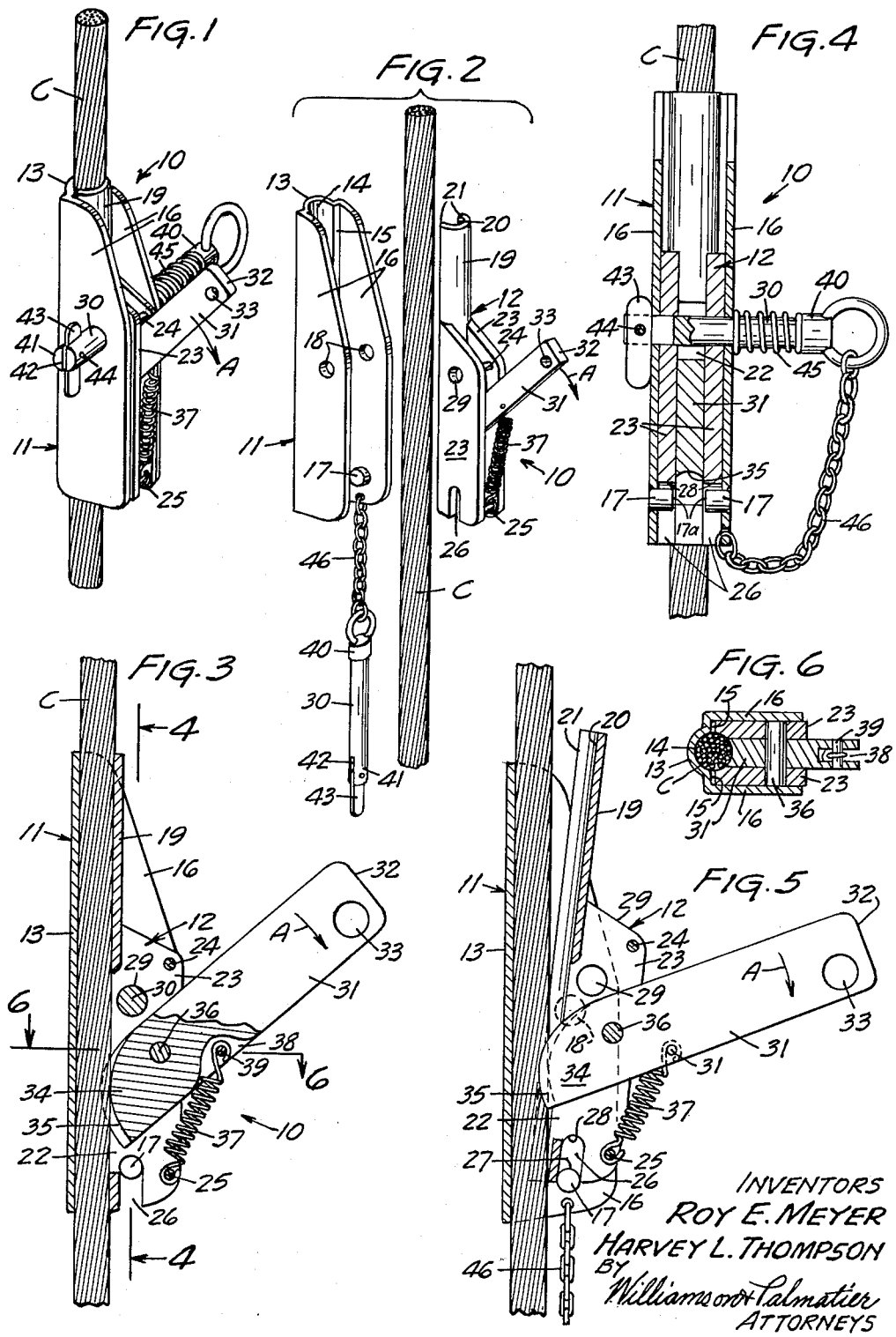

3,179,994
SAFETY APPLIANCE
Roy E. Meyer and Harvey L. Thompson, Red Wing, Minn., assignors to Meyer Machine, Inc., Red Wing, Minn., a corporation of Minnesota
Filed Jan. 22, 1964, Ser. No. 339,497
7 Claims. (Cl. 24—134)

This invention relates to a safety appliance releasably attachable to an upright safety cable and adapted to clamp upon the cable to prevent falling by a workman climbing an elevated structure or tower.

Although such cable clamping safety appliances have been known heretofore, it has been found that in many applications of such appliances on safety cables, there oftentimes is a need for a plurality of such devices on a cable so that a number of workmen may utilize the same safety cable in climbing to elevated positions. In some instances only a single workman need go aloft, however, there are many occasions when a plurality of workmen are necessary to perform a particular job at the top of a tower-like structure. Safety devices that have been used in the past have been primarily adapted to be mounted upon a safety cable and remain there throughout their useful life, and oftentimes in such a situation, there is an inadequate number of safety appliances to accommodate the number of workmen who must go up the structure. Obviously such lack of safety equipment or the alternate of improvising safety equipment is bad practice.

With these comments in mind it is to the elimination of these and other undesirable features in safety appliances to which the present invention is directed together with the inclusion of other novel and desirable features.

An object of our invention is to provide a new and improved cable clamping safety appliance which is readily and easily applicable to a safety cable and which is of simple and inexpensive construction and operation.

Another object of our invention is the provision of a novel cable clamping safety appliance provided with separable components readily and easily applicable to and removable from a safety cable and provided with interfitting locking apparatus which is continuously maintained under tension while the components are on the cable so as to cause a binding therebetween and thereby minimize the likelihood of accidental removal of the appliance from the cable.

A further object of our invention is the provision of an improved and novel cable clamping safety appliance provided with separable components readily and easily applicable to and removable from a cable and having a plurality of cooperating component-locking devices which must be operated in a predetermined sequence to effect release of the components from each other and thereby minimize likelihood of accidental removal of the appliance from the cable.

A still further object of my invention is to provide a new and novel cable clamping safety appliance for use in conjunction with a safety belt by a workman moving up and down a tower-like structure and adjacent an upright safety cable thereon, said appliance having separable components readily and easily applicable to and removable from the cable and one of said components being adapted for attachment to the safety belt, the appliance being adapted to freely slide upwardly along the cable without manual manipulation and the appliance requiring manual manipulation to permit movement thereof downwardly along the cable, and the appliance requiring upward movement of the belt attachment component to effect release of said components with respect to each other whereby to minimize the risk of accidental release of the appliance from the cable.

These and other objects and advantages of our invention will more fully appear from the following description made in connection with the accompanying drawings wherein like reference characters refer to the same or similar parts throughout the several views and in which:

FIG. 1 is a perspective view of the invention applied to a safety cable;

FIG. 2 is an exploded perspective view showing the separable components of the safety appliance in position for application to the safety cable;

FIG. 3 is a section view taken longitudinally through the appliance and shown attached to a safety cable in operable condition;

FIG. 4 is a section view taken approximately at 4—4 in FIG. 3;

FIG. 5 is a section view similar to FIG. 3 but showing the appliance in partially removed condition; and FIG. 6 is a detailed section view taken at 6—6 in FIG. 3.

One form of the present invention is shown in the drawings and is described herein.

The safety appliance is indicated in general by numeral 10 and is attachable to an upright safety cable C of the type which is ordinarily attached at top and bottom to the upper and lower portions of a tower-like structure such as a high building, water tower, flood lighting tower structure or the like.

The appliance 10 includes a frame member 11 and a body member 12. The frame member 11 has an elongate upright cable-guiding portion 13 with an elongate and generally semicircular cable-receiving and cradling recess 14 therein. At opposite sides of the recess 14, the frame member 11 has shoulder surfaces 15 which confront the body member 12 and maintain a predetermined relationship with the body member during assembly of the frame and body member apart from a cable.

The frame member 11 also has a pair of forwardly projecting upright flanges 16 which are spaced from each other so as to define an open and unobstructed space therebetween as illustrated in FIG. 2 to facilitate application and removal of the cable C therebetween. The lower portions of each of the flanges 16 have inwardly projecting pins or lugs 17 affixed thereto as by welding and disposed in alignment with each other transversely of the flanges. The pins or lugs 17 have inner ends 17a which are spaced from each other a distance substantially equal to but slightly in excess of the diameter of the cable C, which conforms to the general shape and size of the recess 14 of the frame member 11. The pins or lugs 17 thereby provide a gauge which is readily visible when the frame and body members 11 and 12 are being assembled with each other to determine whether the cable C will fit properly in the safety appliance 10 so that the safety appliance will operate with minimum effectiveness. In view of the removability of the appliance 10 from a stationary cable C the user of the appliance will certainly want to be assured that the cable to which the appliance is being applied at any particular time will properly function in cooperation with the appliance 10 in restraining or stopping undesired downward movement of the appliance along the cable.

The upper portion of the flanges 16 are provided with aligned apertures 18.

The body member 12 also has an elongate upright cable-guiding portion 19 with a cable-receiving and cradling recess 20 formed therein and of a configuration or curvature corresponding to recess 14 so as to cooperate with recess 14 in being freely movable along the cable C. The rearwardly facing side edges 21 of the cable-guiding portion 19 confront the shoulder surfaces 15 of the frame member 11.

The body member 12 also has an elongate upright slot 22 formed through said cable-guiding portion 19 to provide access into the recess 20 and to the cable C.

The body member 12 also has a pair of forwardly projecting upright rigid side plates 23 disposed at opposite sides of the slot 22 and rigidly maintained in spaced relation with each other by a pair of transverse spacer pins 24 and 25 which are affixed as by welding to the side plates. Each of the side plates 23 has a downwardly opening and vertically extending pin-receiving notch 26 therein and formed to substantially the identical dimensions of the pins or lugs 17 to receive said pins in snug-fitting relation. When the appliance is assembled in the manner illustrated in FIG. 3, the frame member 11 supports, at the upper surface portions 27 of pins 17, the body member 12 at the downwardly facing end surfaces 28 of the notches 26. The pin and notch connection including the pin 17 and notch 26 requires that the body member 12 be shifted upwardly with respect to frame member 11 in order to effect removal of the appliance from the cable.

The side plates 23 of body member 12 are also provided with aligned apertures 29, which align with the apertures 18 of flanges 16 when the appliance 10 is assembled on the cable.

A removable locking pin or key 30 of a size substantially identical to that of apertures 29 and 18 extends through said apertures for cooperating with the pin and notch connection in maintaining the body member 12 immobile with respect to frame member 11.

The body member 12 is also provided with an operating lever 31 having a forwardly projecting outer end 32 with an apertures 33 therein facilitating attachment of a hook or other device of a workman's safety belt whereby to attach the safety belt thereto. The control lever also has an inner end 34 with a rounded friction shoe 35 formed thereon which projects through the slot 22 into engagement with the cable C. Control lever 31 is swingably mounted on a rigid pivot 36 which extends between and is affixed to side plates 23 as by welding. It will be noted that the pivot pin 36 is disposed obliquely outwardly and upwardly of the friction shoe 35, thereby necessitating downward swinging of the inner end 34 of control lever 31 in order to release the friction shoe from the cable, and to cause additional binding or gripping relation between the cable C and the friction shoe 35 when the outer end 32 of the control lever 31 is urged downwardly as under the influence of the weight of the workman's body.

The control lever is continuously urged by spring 37 in a clockwise direction as indicated by arrow A in FIG. 1, so as to continuously urge the friction shoe into binding relation with the cable C. The control lever 31 has a recess 38 in which an anchor pin 39 is affixed, onto which the upper end of spring 37 is hook or anchored. The lower end of spring 37 is anchored to the body member 12 by attachment to the cross pin 25.

It will be noted that the removable locking pin or key 30 has on one end an enlarged head 40 which is spaced from the adjacent side flange 16. The other end 41 of the pin or key 30 is bifurcated and thereby provided with a longitudinally extending slot or recess 42 in which an elongate latching element 43 is swingably mounted on a pivot pin 44. The latching element extends entirely across the pin 30 and bears against the adjacent flange 16. The lower or depending end of latching element 43 is longer and therefore weighted as compared to the upper end thereof and will thereby swing to the position shown in FIGS. 1 and 4 when the pin 30 is projected through the aligned apertures.

A compression spring 45 encompasses the pin 30 and bears at its opposite ends against the head 40 and against the flange 16 so as to continuously urge the latching element 43 tightly against the adjacent flange 16.

The removable pin 30 is loosely secured to the frame member 11 by an attaching chain 46.

In use, when the appliance is disassembled, as illustrated in FIG. 2, and is to be attached to a safety cable, the frame member 11 is first applied to the cable C. In order to determine whether the safety appliance will properly operate on the particular size cable the cable should pass between the confronting ends 17a of pins or lugs 17 in close-fitting relation, whereupon, the cable will thereafter be disposed in the recess 14. The body member 12 is then applied by moving the body member downwardly so that the notches 26 receive the lugs 17. As the notches 26 slide downwardly over the pins 17, the upper portion of body member 12 will be swung inwardly against the cable. It will be noted that the friction shoe 35 immediately engages the cable C prior to complete alignment of all of the apertures 29 and 18. When the apertures 29 and 18 are aligned, the control lever 31 will, as a result of engagement of friction shoe 35 with the cable, swing upwardly as to tension spring 37 and the control lever will continuously be maintained in said position or in a position swung counter-clockwise to that shown in FIG. 5. The locking pin 30 will thereupon be moved through the aligned apertures until the spring 45 engages the adjacent flange 16 and then the control pin will be urged somewhat further through the aligned apertures, while compressing spring 45 so as to allow the latching element 43 transversely of the pin. When the pin 30 is manually released, the pressure of spring 45 will draw the latching element 43 tightly against the adjacent flange 16, thereby preventing accidental swinging or releasing of the latching element 43. The workman may thereupon attach his safety belt to the control lever at aperture 33 and proceed up the tower.

It will be noted that the location of the pin 30 at a position above the control lever 31, which must be manually manipulated while descending along the cable C, minimizes the possibility of an unobserved manipulation of the pin 30 as during the manipulation of lever 31, and furthermore when the pin 30 is manipulated so as to remove the pin from the aligned apertures, there is not likely to be any interference as by the workman's glove with the control lever 31.

In climbing extremely high structures of certain types, the climbing is oftentimes in stages and along various sections of the structure so as to necessitate removal of the appliance 10 as the workman completes one stage of climbing so that the appliance may be taken along and fastened to another safety cable at a second stage of ascent. It is therefore important that the removal of the appliance 10 be accomplished easily, but only as a result of deliberate steps occurring in a predetermined sequence. It is further desirable as to prevent dropping of any parts of the appliance that the workman know for sure when the several components of the appliance are released from each other for removal from the cable.

During removal of the appliance 10, the locking pin 30 must first be pressed inwardly against the action of compression spring 45. Latching element 43 may then be swung into alignment with the pin 30. Spring 45 will commence the withdrawal again of the locking pin 30, but in order to extract the locking pin 30 from the aligned apertures 18 and 29 the pin 30 must actually be pulled manually from the appliance, at which time the pin may be released and will be supported by the chain 46. Because of the abutment between the lower portions of edges 21 of body member 12 and shoulder surfaces 15 of frame member 11, both of which extend parallel to the notches 26 and downwardly therealong to the extreme bottom of the appliance, the mere removal of the locking pin 30 does not effect complete release of the frame and body members. The body member must be moved upwardly, substantially to the position illustrated in FIG. 5 before the body member may be swung or moved transversely outwardly from the frame member 11. It will be understood that as the body member 12 is shifted upwardly, substantially to the point of release from pins 17 as illustrated in FIG. 5, the resilient pressure of spring 37 acting through the friction shoe 35 on the cable C, will cause the body member to automatically swing or pop out, somewhat to the position illustrated in FIG. 5, whereupon the workman who is unfastening the safety appliance at the top of the tower and therefore under rather adverse conditions, knows for sure that the appliance is then ready to be removed from the cable C. The outward swinging or popping of the body member 12 serves as an indicator or signal to the workman that the components may at that time be freed from the cable.

When the appliance 10 has been assembled and is in use in the manner illustrated in FIG. 1, it is to be noted that as a result of the cooperative construction of all of the various phases of the appliance, there is no likelihood that the appliance would accidentally release from the cable. Because of the sequential distinct steps necessary for removal of the locking pin 30 there is only an absolute minimum likelihood that the pin would be removed accidentally, particularly in view of the simplicity in the inserting operation for the pin which merely involves moving the pin through the apertures and then pressing slightly against the pressure of the spring. Removal of the body member 12 from the frame member 11 requires upward movement of the body member with respect to the frame member which is contrary to the downward direction of force which would be applied to the body member 12 and lever 31 if the weight of a workman should be carried thereby.

It will therefore been seen that we have provided a novel and improved cable-clamping safety appliance for use in conjunction with a workman's safety belt for preventing falls when ascending, descending or working upon a tower-like structure and wherein the safety appliance may be readily and easily applied and removed to and from the cable upon the performance of a distinct series of sequential mechanical operations. The interlocking apparatus is of simple and inexpensive construction as to be unlikely to be damaged during use, and furthermore, the normal use of the appliance cause the interlocking apparatus to have its interlocking effect accentuated because of the several components which accumulatively produce a binding effect particularly when the weight of a workman's body will be applied to the appliance.

It will, of course, be understood that various changes may be made in the form, detail, arrangement and proportion of the parts without departing from the scope of our invention which consists of the matter described herein and set forth in the appended claims.

What is claimed is:

1. A safety appliance removably applicable to an upright safety cable and adapted for attachment to a workman's safety belt,
   comprising a rigid body member having opposite sides and having an elongate upright cable-cradling recess therein and having an upright slot therethrough at said recess to provide access to the cable,
   a control lever in said slot and having an inner end with a friction shoe thereon to engage and bind the cable, said lever also having an outer end adapted for connection to the workman's safety belt,
   a pivot on said body member mounting said lever for vertical swinging in said slot, said pivot being disposed obliquely outwardly and upwardly of said shoe to require downward swinging of the inner end and upward swinging of the outer end of said lever to release the shoe from the cable,
   spring means biasing said lever about the pivot to swing the shoe into the recess and against the cable,
   an elongate frame member having an elongate cable-cradling recess confronting the recess of said body member and the cable, said frame member having opposite sides with abutment means thereon engaging said body member along the recess to maintain a freely slidable relation between the cable and said members,
   one of said members including side flanges affixed on the opposite sides thereof and extending along the sides of the other of said members in confronting relation therewith, said flanges defining an unobstructed cable-receiving space therebetween to permit application and removal of the cable,
   one of said members having a pair of transversely projecting pins, the other of said members having upright pin-receiving notches therein receiving said pins and cooperatively defining a pin and notch connection between said members, said pin and notch connection having upwardly facing surfaces on said frame member and downwardly facing surfaces on said body member to support the body member on the frame member and to necessitate upward movement of said body member with respect to said frame member to release said members from each other and permit removal thereof from the cable,
   said members having aligned apertures vertically spaced from said pin and notch connection,
   and a removable locking pin extending through said aligned apertures and preventing relative movement of said members with respect to each other in vertical and transverse directions.

2. The safety appliance of claim 1 wherein said friction shoe is disposed in a vertical direction between said pin and notch connection and the apertures with the removable locking pin therein.

3. The safety appliance of claim 1 wherein said recesses define a guideway of a predetermined size for guiding along a cable of a certain size whereby to maintain a predetermined relationship between said friction shoe and the cable,
   said transversely projecting pins being affixed on said flanges and respectively projecting inwardly in opposite directions into said unobstructed space in aligned relation with each other, and said pins being spaced from each other a distance substantially equal to the diameter of said guideway and thereby provide a visible cable-diameter gauge permitting ready and easy determination of the applicability of the safety appliance to a particular cable.

4. The safety appliance according to claim 1 wherein said apertures are disposed in said flanges, and said removable locking pin has opposite ends respectively disposed adjacent said flanges, one end of said removable locking pin having a head thereon, the other end of said locking pin having a longitudinally extending recess therein, an elongate latching element swingably mounted in said recess and extending transversely therefrom in both directions and lying against the adjacent flange to prevent removal of the pin, said latching element having a depending weighted end to swing downwardly by gravity when the pin is inserted through the apertures of said member, and said latching element being swingable into alignment with the pin to permit removal of the pin,
   and a compression spring on the pin and resiliently bearing against the head and against the adjacent flange to continuously urge and maintain said latching element in pin-retaining position against the corresponding flange, whereby to require in removal of the appliance from a cable, successive distinct steps of moving the pin against the pressure of the compressed spring, swinging of the latching element into alignment with the pin, removal of the pin, and upward shifting of the body member with respect to the frame member.

5. The safety appliance according to claim 3 wherein said body and frame members have upper and lower portions, said pin and notch connection being disposed in said lower portions of said members, and said aligned apertures and removable locking pin being disposed in said upper portions, said slot and lever being disposed between said upper and lower portions to readily facilitate removal of the pin without disturbing said lever.

6. A safety appliance removably applicable to an upright safety cable and adapted for attachment to a workman's safety belt, comprising a rigid body member having an elongate upright cable-cradling recess therein and having an upright slot therethrough at said recess to provide access to the cable, a control lever in said slot and having an inner end with a friction shoe thereon to engage and bind the cable, said lever also having an outer end adapted for connection to the workman's safety belt, a pivot on said body member and mounting said lever for vertical swinging in said slot, said pivot being disposed upwardly and outwardly of said shoe to require downward swinging of the inner end and upwardly swinging of the outer end of said lever to release the shoe from the cable, a spring connected between said body member and said lever and continuously urging said shoe into the recess and against the cable and thereby also urging said body member away from the cable, an elongate frame member having an elongate cable-guiding recess confronting the recess of said body member with the cable therein, means detachably securing said body member and frame member together and including a pair of transversely projecting pins on one of said members and a pair of upright pin-receiving notches in the other of said members, to thereby define a pin and notch connection between said members and operable in relative vertical movement between said members, said means also including aligned apertures through said members and spaced in a vertical direction from said pin and notch connection, and a removable locking pin extending through said aligned apertures and preventing relative movement of said members with respect to each other in vertical and transverse directions, whereby in removal of said appliance from the cable said spring and shoe bearing against the cable effects a distinct movement of said body member away from the cable at the instant of relative vertical movement between said members is sufficient to release said pin and notch connection.

7. A safety appliance removably applicable to an upright safety cable and adapted for attachment to a workman's safety belt, comprising a rigid body member having an elongate upright cable-guiding portion with an elongate cable-receiving recess extending longitudinally therealong and facing rearwardly thereof, said cable-guiding portion having opposite sides and having an upright slot therethrough and disposed between said sides to provide access to the cable in the recess, said body member including a pair of generally parallel side plates affixed to opposite sides of said guiding portion and projecting in substantially parallel and spaced relation with each other forwardly from said guiding portion, said side plates having upper and lower portions and having downwardly opening notches in said lower portions, said upper portions having aligned apertures therethrough, a control lever having a rearwardly extending inner end between said plates and having a friction shoe thereon to engage and bind the cable at said slot, said lever also having a forwardly projecting outer end adapted for connection to the workman's safety belt, a pivot on said side plates and mounting said lever for vertical swinging in said slots, said pivot being disposed obliquely outwardly and upwardly of said shoe to require downward swinging of said inner end and upward swinging of the outer end of said lever to release the shoe from the cable, a spring connected with said body member and with said lever and continuously urging said shoe inwardly of the recess toward the cable, an elongate frame member having an elongate forwardly facing cable-receiving recess confronting the recess of said body member, said frame member having shoulder surfaces adjacent opposite sides of said recess and abutting said body member along the recess therein to maintain a freely slidable relation between the cable and said body and frame members, said frame member having forwardly projecting flanges lying along the side plates of said body member in confronting relation therewith and said flanges defining an unobstructed cable-receiving space therebetween to permit application and removal of the cable, said flanges having upper and lower portions and having a pair of rigid pins affixed in aligned and spaced relation with each other in said lower portions of the flanges to be inserted into said notches of the body member, the upper portions of said flanges having apertures therein aligned with the apertures of said side plates, and a removable locking pin extending through said aligned apertures and having opposite ends each disposed adjacent a respective flange, one end of said locking pin being bifurcated and having a latching element swingably mounted therein and extending transversely of the pin in engagement with the adjacent flange, said latching element being swingable into alignment with the pin to permit removal of the pin from the apertures, the other end of said locking pin having an enlarged head therein, and a compression spring resiliently bearing against said head and the adjacent flange to continuously urge said latching element against the adjacent flange to prevent accidental removal of the locking pin from said apertures.

No references cited.

ARTHUR L. LA POINT, *Primary Examiner.*